June 2, 1953 — C. B. JENSEN — 2,640,414
APPARATUS FOR SMOKING AND CURING FOOD PRODUCTS
Filed May 17, 1950 — 4 Sheets-Sheet 1

INVENTOR.
Charles B. Jensen
BY
Kegan and Kegan
Attys.

June 2, 1953   C. B. JENSEN   2,640,414
APPARATUS FOR SMOKING AND CURING FOOD PRODUCTS
Filed May 17, 1950   4 Sheets-Sheet 2
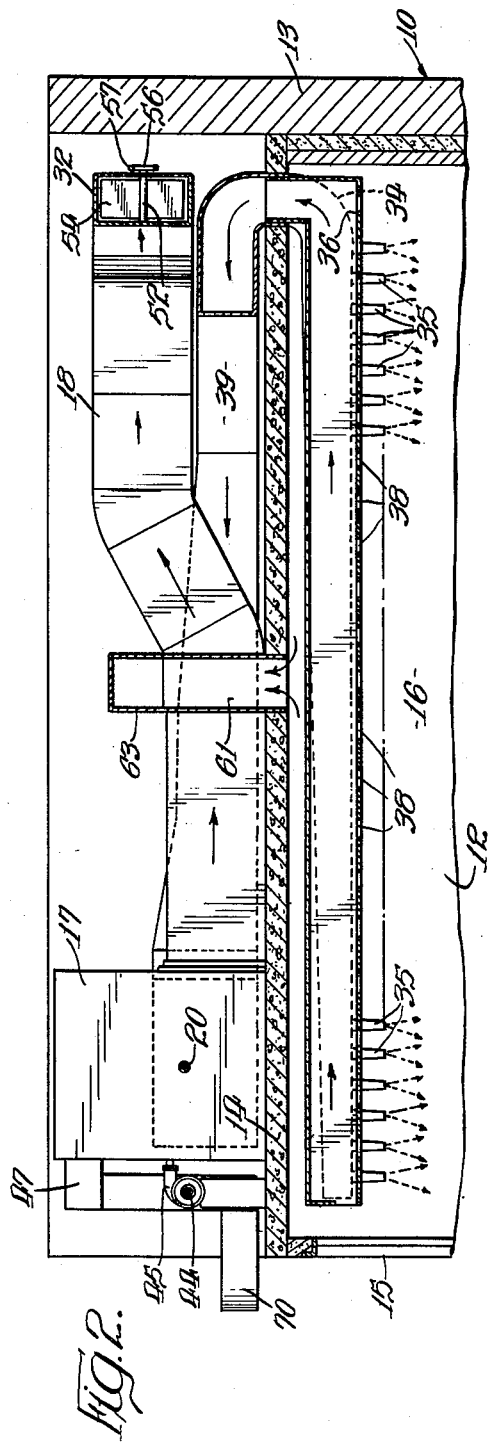
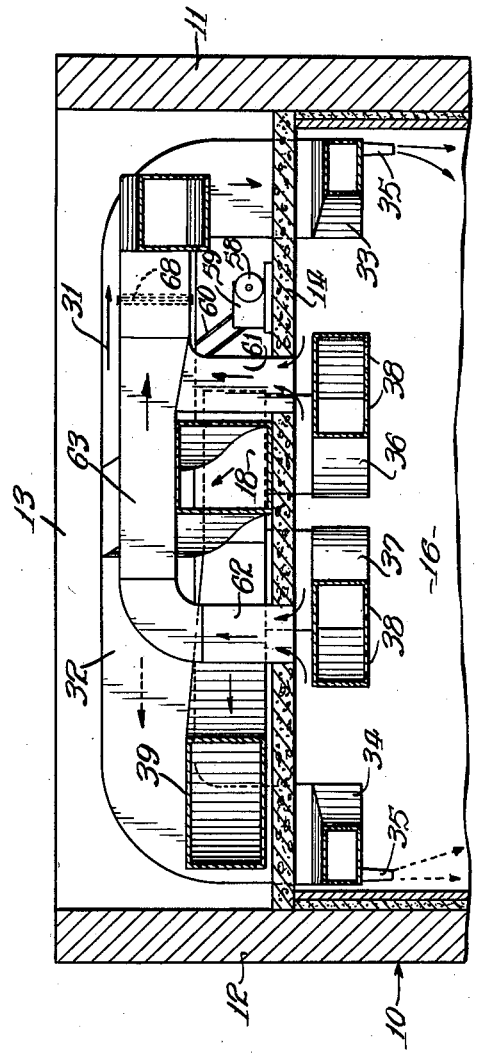
INVENTOR.
Charles B. Jensen
BY
Kegan and Kegan
Attys.

June 2, 1953   C. B. JENSEN   2,640,414
APPARATUS FOR SMOKING AND CURING FOOD PRODUCTS
Filed May 17, 1950   4 Sheets-Sheet 3
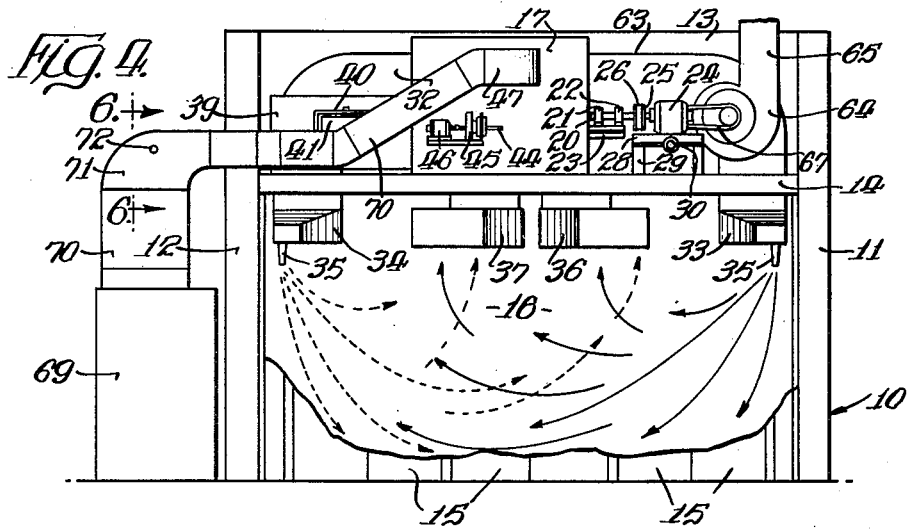
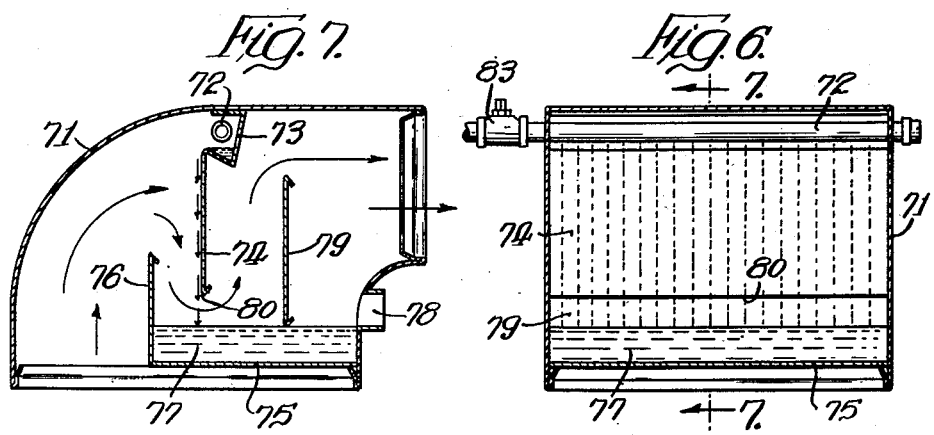
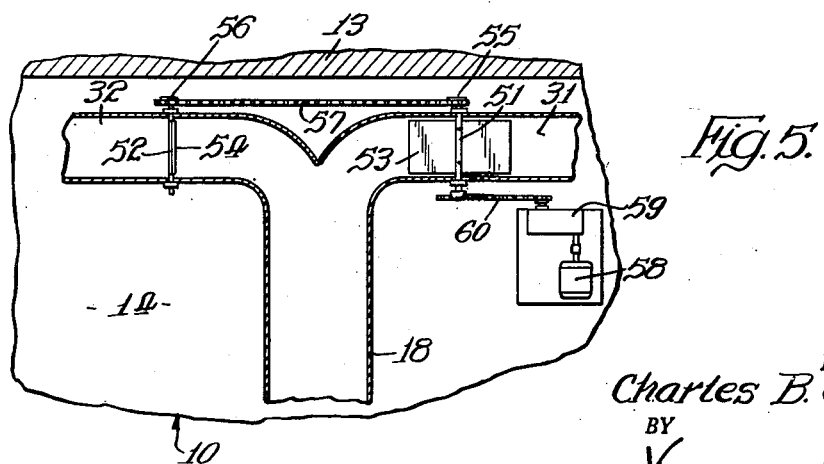
INVENTOR.
Charles B. Jensen
BY
Kegan and Kegan
Attys.

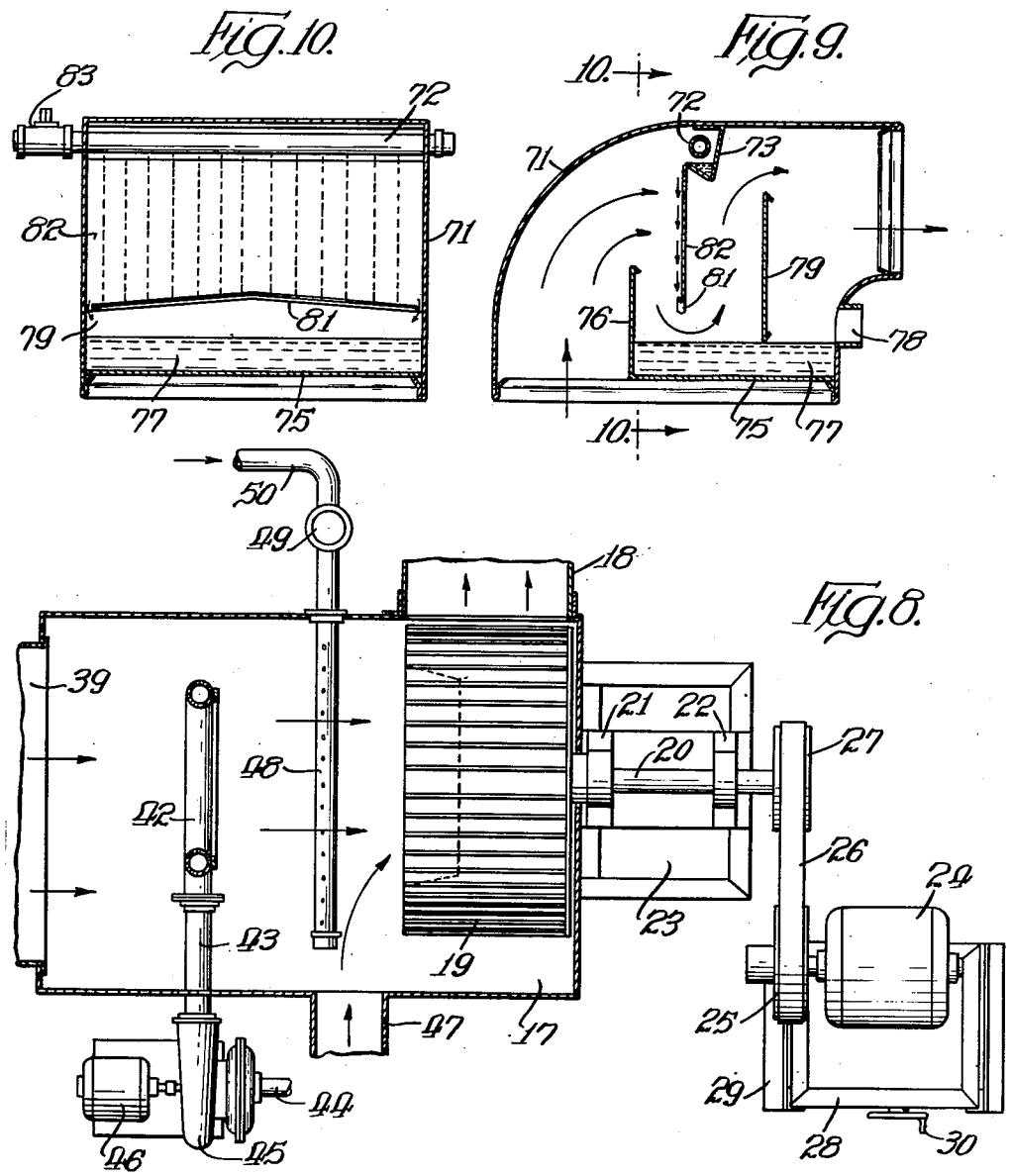

Patented June 2, 1953

2,640,414

UNITED STATES PATENT OFFICE 2,640,414

APPARATUS FOR SMOKING AND CURING FOOD PRODUCTS

Charles B. Jensen, Chicago, Ill., assignor to Atmos Corporation, Chicago, Ill., a corporation of Illinois Application May 17, 1950, Serial No. 162,511

3 Claims. (Cl. 99—259)

My invention relates generally to apparatus for smoking, curing, drying and/or cooking food products such as hams, bacon, frankfurt sausages, bologna, and fish. More particularly, my invention relates to improvements in apparatus for introducing and distributing smoke and other fluids within a smokehouse.

A principal object of my invention is to provide smoking and curing apparatus characterized by a highly uniform and efficient circulation of air, smoke, and steam.

A more specific object of my invention is to provide apparatus which removes embers from the smoke before it is introduced into the distributing system, but which does not remove desirable and valuable flavoring and smoking agents normally present in freshly generated smoke.

The foregoing and such other objects, advantages and capabilities as are disclosed as this description proceeds, or which are inherent in my invention, are illustrated in the accompanying drawings, in which:

Figure 2 is a fragmentary right side elevational view, taken in section on the line 2—2 of Figure 1;

Figure 3 is a fragmentary front elevational view taken in section on the line 3—3 of Figure 1;

Figure 4 is a front elevational view, with some parts thereof broken away to show interior details of the smokehouse;

Figure 5 is a fragmentary, detailed plan view of the alternating damper drive mechanism of the embodiment of Figure 1;

Figure 6 is a left side elevational view taken in section on the line 6—6 of Figure 4, showing details of the spark arrester interposed in the line between the smoke generator and the distributing system of the smokehouse;

Figure 7 is a front elevational view taken in section on the line 7—7 of Figure 6;

Figure 8 is a fragmentary plan view showing details of the fluid heating and propelling apparatus of the embodiment of Figure 1;

Figure 9 is a front elevational view, in section, of a modification of the spark arrester shown in Figure 7; and Figure 10 is a left side elevational view taken in section on the line 10—10 of Figure 9.

Like reference characters designate like parts in the drawings and in the description of my invention which follows.

Figure 1:
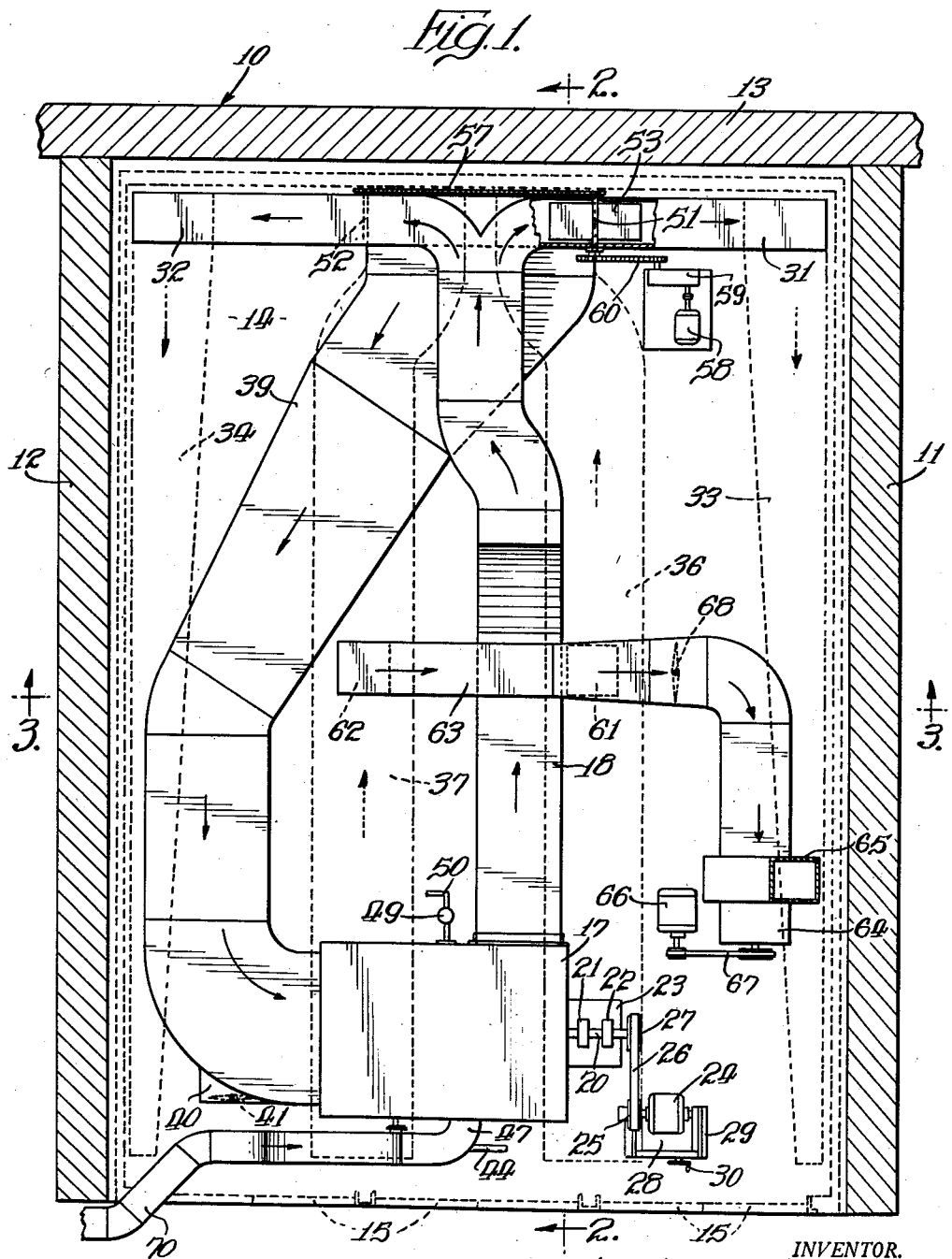
Figure 1 is a fragmentary plan view, taken partly in section, of a smokehouse embodying my invention.

Referring now to the drawings, my apparatus is shown as including a smokehouse, designated generally by the numeral 10, which comprises two side walls 11 and 12, a rear wall 13, a roof 14, and a plurality of doors 15. The walls 11, 12 and 13, and the roof 14 preferably are insulated to prevent loss of heat from the smokehouse 10 to the surrounding air. The doors 15 are preferably both insulated and constructed to seal the interior 16 of the smokehouse 10 to prevent the escape of smoke and other fluids therefrom.

Referring now to Figure 1, the fluid circulating system of my novel apparatus includes a flow control unit 17 on the roof 14 adjacent the doors 15, from which a supply line 18 extends. As best shown in Figure 8, any air and/or smoke present in unit 17, is forced into the supply line 18 by the impeller wheel 19. The impeller wheel drive shaft 20 is supported by the two bearings 21 and 22 secured to the pedestal 23. The impeller wheel 19 is driven by the motor 24 through the motor pulley 25, the belt 26, and the pulley 27 on the shaft 20. The support 28 for the motor 24 is slidable on the stand 29, whereby the tension of the pulley 27 may be adjusted by means of the hand wheel 30, which operates a conventional screw-type adjusting mechanism (not shown).

Referring now to Figures 1 and 5, the supply line 18 extends substantially along the middle of the roof 14 between the side walls 11, 12 and symmetrically divides into two legs 31 and 32 adjacent to the rear wall 13 of the smokehouse 10. The leg 31 in turn extends through the roof 14 and connects with the supply duct 33 positioned adjacent to the roof 14 and to side wall 11. Similarly, the leg 32 is connected to a supply duct 34 which is positioned in the interior 16 of the smokehouse 10 adjacent to the roof 14 and the side wall 12. A plurality of air nozzles 35 distributed along the side walls 11, 12 extend downwardly from each of the supply ducts 33 and 34. Positioned intermediate the supply ducts 33 and 34, and at substantially the same level within the smokehouse 10, are two return ducts 36 and 37. Each of said return ducts 36 and 37 is provided with a plurality of apertures 38, distributed similarly to the nozzles 35 and through which fluid circulating within the smokehouse 10 may be exhausted. Said ducts 36 and 37 in turn are connected to a return header 39 which extends over the roof 14 and discharges into the intake side of the flow control unit 17. A fresh air intake 40 is placed in the return header 39 proximate to the flow control unit 17, and is provided with a manually adjustable damper 41, although obviously an automatic control could be provided for said damper 41 if desired.

Again referring to Figure 8, the flow control unit 17 is provided with heating means on the intake side of the impeller 19, which are shown to be in the form of a ring-type gas burner 42, although it will be apparent that other conventional heating means may be used instead. Gas is supplied to the burner 42 through the connection 43, said connection 43 in turn being connected to a supply line 44 through the centrifugal pump 45, which is driven by the motor 46. The flow control unit 17 also includes an inlet connection 47 through which smoke may be introduced into the intake of the impeller wheel 19. In addition, a steam ejector pipe 48 extends into the flow control unit 17, a control valve 49 being inserted in the supply line 50 connected to said pipe 48. Thus, the control unit 17 has provision for heating and then impelling the air circulating therethrough, introducing smoke into said air, and at the same time introducing steam into the air and smoke stream either for the purpose of humidification, or for cooking foodstuffs placed within the smokehouse 10.

Referring now to Figure 5, rotatable shafts 51 and 52 are mounted in the legs 31 and 32 symmetrically to the supply line 18. A damper 53 is secured to the shaft 51, while a similar damper 54 is secured to the shaft 52. Sprocket drive wheels 55 and 56 are mounted on the shafts 51 and 52, respectively, and are interconnected by a drive chain 57, whereby the dampers 53 and 54 are maintained substantially 90° out of phase with each other, as shown in Figure 5. The shaft 51 is turned by the drive motor 58, through the intermediary of the gear reduction unit 59 and the drive belt 60.

As best shown in Figures 1 and 3, two legs 61 and 62 of an atmospheric exhaust duct 63 extend through the roof 14 to draw off spent air and smoke from within the interior 16 of the smokehouse 10. A blower unit 64 is interposed between the exhaust duct 63 and the stack 65, and is driven by the motor 66 through the drive belt 67. A damper 68, which may be either manually or automatically controlled, is placed in the exhaust duct 63, to control the amount of fluid which is removed from the smokehouse 10 through the exhaust system.

Referring now to Figure 4, a smoke generator unit 69 is connected to the inlet connection 47 of the flow control unit 17 through the conduit 70. Interposed in the elbow portion 71 of the conduit 70, are spark arresting means, shown in detail in Figures 6 and 7. Extending into the elbow portion 71 is a water line 72, which discharges water into the trough 73, from whence it overflows to drain down the baffle 74. By means of the control valve 83 in the line 72, the flow of water into the trough 73 may be adjusted. A horizontally disposed plate 75 and a vertical deflector 76 form a sump 77 beneath the baffle 74, and into which water drains from said baffle 74; the deflector 76 being positioned between the smoke generator 69 and baffle 74 and having a top edge slightly above the bottom edge of the baffle. An overflow connection 78 maintains the surface of the water in the sump 77 at a substantially constant level below said bottom edge, while a secondary baffle 79 extends upwardly from the surface of the water in the sump 77 to further control the flow of the smoke-laden air in the elbow portion 71.

Figures 9 and 10 illustrate a modified form of the spark arresting means in the elbow portion 71. Whereas in the embodiment of Figures 6 and 7, the water drains into the sump 77 from the lower edge 80 of the baffle 74 in the form of a fine spray, in the device of Figures 9 and 10 the water is collected by the lip 81 of the baffle 82 and carried to the sides of the elbow portion 71, from which it drains into the sump 77. In all other respects, the device of Figures 9 and 10 corresponds with that of Figures 6 and 7, and accordingly the corresponding parts are numbered similarly.

*Operation of apparatus*

The initial step in using my apparatus is to place the food products to be treated within the interior 16 of the smokehouse 10, usually by suspending said products from hooks, or placing them upon a portable rack. To smoke and cure the food products, smoke is generated in the generator 69, by means of saw dust or other smoke producing material. As the smoke-laden air from the generator 69 moves up the conduit 70, it is directed against the baffle 74 by the curved outer wall of and deflector 76 in the elbow 71. It is not uncommon for the smoke-laden air which is discharged from the generator 69, to contain embers, and it is imperative that said embers be prevented from travelling into the interior 16 of the smokehouse 10, where they might damage the food products or even cause a serious fire. Such embers are projected into and quenched by the thin film of water flowing down the baffle 74. However the different fluid flows can be such as not to wash the smoke-ladened air to the extent that valuable flavoring and smoking agents are removed therefrom; the body of the smoke-laden air being contacted with the film of water only once and only in a limited area. The fluid introduced into the control unit 17 through the inlet connection 47 therefore contains a maximum amount of the valuable flavoring and smoking agents which are produced by the smoke generator 69, while being free of sparks or embers capable of being projected against any solid surfaces.

Advantageously, even the very small amount of washing of the air by the water draining from the baffle 74 into the sump 77, can be eliminated by means of the modified construction of Figures 9 and 10, in which the water draining down the baffle 82 is collected by the lip 81 and carried to the sides of the elbow portion 71 before draining into the sump 7. Thus the smoke-laden air can pass between the lower lip 81 and the surface of the water in the sump 77 without any washing; yet the embers are caught and extinguished by the film of water on the baffle 82.

As the smoke-laden air flows into the control unit 17, it is heated by the burner or heater 42, whereafter the impeller wheel 19 forces said air into the supply line 18 and through the same. Since the motor 58 (Figure 5) is slowly rotating the shafts 51 and 52, and since the dampers 53 and 54 are 90 degrees out of phase with each other, the smoke-laden air in the line 18 passes first into one of the legs 31, 32 and then into the other leg, in alternating fashion. The flow of air from the air nozzles 35 of the supply ducts 33 and 34 is therefore alternating, with the result that a flow of fluid is established within the interior 16 of the smokehouse 10 similar to that depicted by the flow arrows of Figure 4. Because of the flow and counterflow of smoke and air about the food products within the smokehouse 10, there is a highly uniform distribution of smoke particles on the food products, as well as a more uniform heating of the products; hence the penetration of the curing and flavoring agents of the smoke is more uniform and pronounced. Air and smoke are continually exhausted from the interior 16 of the smokehouse 10 principally through the return ducts 36 and 37, whence it is returned to the control unit 17 through the header 39 for recirculation. If desired, a portion of the air within the smokehouse 10 may be exhausted to the exhaust stack 65 through the two legs 61 and 62 of the exhaust duct 63.

As the air returns to the control unit 17, it is heated to a predetermined temperature by the ring-type burner 42, and again carried into the supply line 18 by the impeller wheel 19. If desired, the humidity of the fluid going to the supply line 18 may be controlled, by introducing a measured quantity of steam into the control unit 17 through the steam ejector pipe 48. Throughout the smoking of the food products, a fresh supply of smoke may be drawn into the control unit 17 through the inlet connection 47.

While my alternating flow apparatus is especially efficient in the case of smoking and curing food products, it also reduces appreciably the process time required both for drying and for cooking the food products within the smokehouse 10. Where dry heat is desired, air is heated by means of the ring-type burner 42 and thereafter circulated in alternating fashion throughout the interior 16 of the smokehouse 10. Because the circulating air picks up moisture from the food products, it is desirable to exhaust a portion of this air to the exhaust stack 65 through the exhaust duct 63. Makeup air is then introduced into the control unit 17 through the adjustable size air intake 40. To cook the food with wet heat, live steam is introduced into the control unit 17 through the steam ejector pipe 48, whence it is discharged into the interior 16 of the smokehouse 10 first from the supply duct 33 and then from the supply duct 34, the resultant continuous flow and counterflow of steam effecting a very rapid and uniform transfer of heat to the food products. The burner 42 can of course be used to augment the heat of the steam emitted by the steam ejector line 48, and by suitable control means (not shown) the temperature and quality of the steam circulating throughout the interior of the smokehouse 10 can be controlled to within close limits. Manifestly, a plurality of fluids are introduced, and operations performed, in the unit 17. The unit receives (1) smoke, freed of embers but rich in flavor-imparting constituents for the comestibles in the smokehouse, from 47; (2) cooled return air with or without moisture, at 39; (3) cool make-up air, potentially with the natural impurities thereof, at 40; (4) (a) dry heat (gas heat) for the heating or reheating of said materials, from 44, 45 and/or (b) wet heat (steam heat) for the same purposes and the humidifying of said materials, from 50; and (5) energy to mix said materials and to propel the same into and through the duct 18, legs 31, 32 and the distribution system 33, 34, 36, 37, 51, 52, from 19, 24. As a result, and particularly by means of the novel spark arresting apparatus 71, 48 comprising a portion of the improved fluid circulating system 17, 18, 39, 70 of my apparatus, no fire or embers are carried into the smokehouse and hence there is no possibility of the products being burned or damaged. Yet, the maximum quantity of flavoring and smoking agents are present in the smoke-laden air which is introduced. These features result in a product of superior flavor.

While I have shown and described certain preferred embodiments of my invention, it is to be understood that these embodiments have been given by way of example only, and that various changes and rearrangements of the details shown herein may be made without departing from the spirit of the invention, the scope of which is defined in the appended claims.

I claim:

1. Apparatus for smoking food products comprising side and end walls and a roof to define a smokehouse; a pair of distributor ducts for smoke-laden air, extending within the smokehouse, parallel with the side walls; similarly extending collector duct means within the smokehouse; a smoke generator adjacent the smokehouse; a receiver unit for generated smoke and other fluids, on the roof, adjacent one end wall, comprising means to heat said fluids and then to mix them and expel them from the receiver unit; a short and narrow connector duct from the smoke generator to the receiver unit; a long and wide supply header, adapted to receive such expelled materials and to pass them slowly from the receiver unit adjacent one end wall over the roof to the opposite end wall so as to arrest sparks and the like, in such materials, said header being substantially symmetrically connected with the pair of distributor means adjacent the opposite end wall; a return header interconnecting the collector duct means with the receiver unit and long and wide supply header and thereby to complete a circulation system for the circulation of smoke-laden air through the smokehouse and the receiver unit; means to introduce air into said circulation; means to remove fluid from said circulation; and additional spark arrestor means, interposed on the duct between the smoke generator and the receiver unit.

2. Apparatus as described in claim 1 wherein the spark arrestor comprises a stationary baffle in the connector between the smoke generator and the receiver unit; means to direct the smoke from the generator toward the baffle and thereby to project embers toward the baffle while allowing smoke-laden air to flow under and past the baffle without prolonged contact between such air and the baffle; means for flooding said baffle with a film of water, and means to drain such water from the spark arrestor.

3. Apparatus as described in claim 2 wherein said baffle comprises a lip at the lower edge thereof to carry the water from said film to the side of the spark arrestor and thereby to remove it from contact with the air passing under and past the baffle.

CHARLES B. JENSEN.

References Cited in the file of this patent

UNITED STATES PATENTS

| Number | Name | Date |
|---|---|---|
| 1,073,622 | Murray et al. | Sept 23, 1913 |
| 1,078,659 | Barry | Nov. 18, 1913 |
| 1,132,678 | Murray et al. | Mar. 23, 1915 |
| 1,455,915 | Johnson | May 27, 1923 |
| 1,644,693 | Robertson | Oct. 11, 1927 |
| 1,813,008 | Winkelmuller | July 7, 1931 |
| 2,310,222 | Deverall | Feb. 9, 1943 |
| 2,312,339 | Jones | Mar. 2, 1943 |
| 2,505,973 | Julian | May 2, 1950 |
| 2,510,524 | Schramm | June 6, 1950 |
| 2,515,455 | Lipton | July 18, 1950 |